United States Patent [19]

Waldron

[11] 4,342,155

[45] Aug. 3, 1982

[54] SIGN-MAKING APPARATUS

[75] Inventor: Gregory R. Waldron, West Oneonta, N.Y.

[73] Assignee: Scott Machine Development Corporation, Walton, N.Y.

[21] Appl. No.: 257,663

[22] Filed: Apr. 27, 1981

Related U.S. Application Data

[63] Continuation of Ser. No. 905,748, May 15, 1978, abandoned.

[51] Int. Cl.[3] ........................ B41B 1/00; B32B 31/20; G09F 7/16

[52] U.S. Cl. ..................................... 33/184.5; 33/445; 40/595; 156/235; 156/299; 156/542; 156/562; 428/187

[58] Field of Search ................. 156/384, 387, 476, 62, 156/235, 240, 299, 540, 541, 542, 560, 561, 562; 101/DIG. 12; 33/184.5, 1 M, 1 D, 1 G, 180 R, 443, 445, 446, 450; 428/187, 195, 914, 211; 40/594, 595

[56] References Cited

U.S. PATENT DOCUMENTS

| | | | |
|---|---|---|---|
| 1,139,984 | 5/1915 | Leethem | 33/184.5 UX |
| 2,696,867 | 12/1954 | Wensink | 33/184.5 X |
| 2,970,043 | 1/1961 | Serafin | 33/184.5 X |
| 3,013,917 | 12/1961 | Karlan et al. | 156/240 X |
| 3,025,211 | 3/1962 | Winn | 156/542 |
| 3,608,206 | 9/1971 | Knott | 273/155 X |
| 3,676,248 | 7/1972 | Swartz | 156/235 |
| 3,690,013 | 9/1972 | Leptrone | 33/184.5 |
| 3,803,729 | 4/1974 | Acerra | 156/230 X |
| 3,945,141 | 3/1976 | Frost | 428/195 X |
| 4,232,452 | 11/1980 | Dowzall et al. | 33/430 |

FOREIGN PATENT DOCUMENTS

| | | |
|---|---|---|
| 2345657 | 3/1975 | Fed. Rep. of Germany . |
| 2402998 | 7/1975 | Fed. Rep. of Germany . |
| 2175487 | 10/1973 | France . |
| 442689 | 2/1936 | United Kingdom . |

*Primary Examiner*—Edward C. Kimlin
*Assistant Examiner*—Thomas Bokan
*Attorney, Agent, or Firm*—Richard G. Stephens

[57] ABSTRACT

Apparatus for sign-making using dry transfer of letters from carrier sheets allows any of a number of different character sizes and row spacings to be provided. A carrier sheet bearing characters of a desired size is positioned relative to a carriage in dependence upon whether a row to be formed contains all upper case characters, or some or all lower-case characters. The carriage is movable smoothly in a horizontal direction to allow any desired horizontal spacing of characters, but movable vertically only in discrete increments. A plurality of row spacing indicators are positionable adjacent a sign blank to afford a preview of how characters of a given size having a given spacing will appear on a sign blank.

42 Claims, 20 Drawing Figures

SIGN-MAKING APPARATUS

RELATED APPLICATION

This application is a continuation of my prior copending application Ser No. 905,748 filed May 15, 1978 now abandoned.

Characters having any desired font or style can be transferred from a flexible carrier sheet to a receiving surface or substrate, such as a plastic strip, or sign blank, by use of a pressure-transfer process described in U.S. Pat. Nos. 3,131,106 and 3,212,913, for example. Carrier sheets carrying entire alphabets of transferable characters with non-transferred reference lines extending below them can be inexpensively produced. To produce a row of characters on a substrate, one need merely place one side of such a sheet in direct contact with the substrate with a selected letter positioned atop a desired location on the substrate and apply pressure by means of stylus on the other side of the sheet in order to transfer the selected letter to the substrate. To place a given letter of a row at the proper vertical location, one moves the sheet until the reference line below the letter is aligned with a temporary reference line drawn across the substrate. The use of pressure transfer (often called dry transfer) for production of signs of the type described has been quite limited, however, because, it is believed, of the serious difficulties involved in properly positioning successive characters atop the substrate or sign blank, particularly when plural rows of characters are needed. Production of a row of characters using pressure transfer tends to require that the carrier sheet be repositioned relative to the substrate for every successive character, and sometimes that different carrier sheets be submitted, so that numerous chances for positioning errors are involved. Mis-positioning even a single character may spoil the appearance of a sign and require that the results of much work be scrapped. It is possible, of course, to print some carrier sheets so that a desired row of characters, and even plural rows of characters, are positioned on a sheet with the spacings desired on a final sign. While that strategm eliminates a need to repeatedly reposition the carrier sheet, it is only useful for standard or pre-arranged signs, and does not lend itself to economical and rapid production of signs to be devised at locations remote from the carrier sheet printing plant. A countless number of different carrier sheets would have to be produced, with great waste, to obtain sheets carrying even a small fraction of the words or messages which are usually needed. Because of such problems, the use of pressure lettering has largely been restricted to limited applications where high labor costs involving tedious positioning operations performed by persons with substantial artistic skill can be tolerated.

Various means which assist an operator to transfer successive characters to a receiving surface in neat, straight rows are shown in the prior art, in for example, DE-A-2 345 657 (Firnges), and in U.S. Pat. No. 3,803,729 (Acerra). The device of the latter patent also assists an operator to place successive rows of characters uniform distances apart, by providing means which allow incremental stepping of a carrier sheet downwardly on a page or sheet. While devices of that nature are very useful for some purposes, they provide quite limited assistance in the production of many signs, because they largely, if not completely, fail to deal with problems of "sign layout", as distinguished from mere "lettering". By allowing an operator to place a row of characters at any vertical location on a sheet or other receiving surface, they inherently do not aid him to space upper and lower rows of characters equal distances from upper and lower edges of a sign blank, for example.

The production of a sign having an optimum appearance tends to require consideration of numerous factors. The factors can be generally grouped into two classes, those of inter-character and other horizontal positioning of characters, and those of inter-row and other vertical positioning of characters. Even totally neglecting the horizontal positioning of characters in a sign, the making of a sign involves consideration of the size of a sign blank, selection of the nominal size of characters to be formed and selection of a desired font or style, how many rows of characters are to be placed on the sign blank, whether the rows use only upper-case characters, or only lower-case characters, or a mixture of both upper-case and lower-case characters, how closely together successive rows should be spaced, whether the rows should be vertically centered relative to the vertical center-line of the sign blank or instead some other line across the sign, and how the rows should be vertically centered relative to one line or another across the sign. If an odd number of rows of characters are to be used, it is usually desired that one row pass through the vertical centerline of the "sight", or portion of the sign blank eventually to remain exposed, while conversely, when an even number of rows are provided, it is usually desired that the vertical centerline of the sight extend between two rows of characters. However, the sight within which the rows are to be placed may depend upon whether a sign holder will obscure a strip along the upper edge of a sign blank or instead the lower edge, or whether neither edge will be obscured. Further complicating the vertical placement of characters on a sign is the fact that most fonts deemed desirable do not contemplate simple placement of successive characters along a row with all their upper edges, or all their lower edges, or all their vertical centerlines falling on a common line, but rather that accepted "baselines" for the different characters fall on a common line, and different characters have their respective baselines located at various vertical locations relative to their extremities. Because of these numerous factors and others, vertical placement of characters on a sign has often tended to require that sketches of one or more sign layouts be made so that their probable appearances can be evaluated before actually beginning production of a sign. It is believed that difficulties associated with vertical positioning of characters combine multiplicatively or exponentially with difficulties associated with horizontal positioning, and that most operators can provide attractive horizontal spacing with far greater ease if they need not simultaneously be concerned with vertical spacing. While the calculations, measurements and making of sketches involve only elementary arithmetic, they tend to involve numerous chances for error, precluding the use of some classes of unskilled and inartistically-inclined labor, as well as being tedious and time consuming. One object of the present invention is to provide improved apparatus for pressure-transfer sign-making which can be used rapidly and accurately by unskilled labor to produce signs having predetermined spacings of horizontal rows of characters relative to upper and lower edges or lines therebetween, of sign blanks, as well as having such rows of characters neat and straight with predetermined vertical spacings of the tows relative to each other.

One object of the present invention is to provide sign making apparatus for forming an operator-selectable number of one or more rows of characters on a sign blank, by transfer of successive characters from an operator selectable carrier sheet, where the sign blank may have any of numerous heights and the characters on the carrier sheet may have any of several nominal heights, wherein the apparatus includes not only means for stepping a carrier sheet vertically in predetermined increments to allow neat and straight rows of characters to be formed, but also means for coordinating the positions at which such stepping locates the characters on the sheet with an edge of the sign blank, in order to locate the rows of characters at predetermined distances relative to an edge of the sign blank. Another object of the invention is to provide in such sign making apparatus a plurality of spacing indicator devices each carrying indicia representing a respective combination of character height and row spacing, and means for locating operator-selectable ones of said spacing indicator devices adjacent an end of a sign blank, thereby to afford to the operator a preview or prior indication of how rows of characters using the character height and row spacing of a selected spacing indicator will fit on a sign blank.

According to the present invention there is provided sign making apparatus for forming one or more rows of characters on a sign blank by transfer of successive characters from a carrier sheet, which apparatus includes a base for supporting said sign blank, a carriage adapted to hold a carrier sheet carrying rows of transferable characters with the baselines of characters in successive rows on said carrier sheet being spaced apart in a first direction on said sheet at integral multiples of a predetermined distance, means for constraining movement of said carriage in said first direction to a plurality of discrete positions spaced apart at said incremental distance, gripping means on said carriage for attaching said carrier sheet to said carriage so that movements of said carriage in said first direction locate the baselines of characters on said sheet at a plurality of locations spaced apart in said first direction at integral multiples of said incremental distance; characterized by first index means for locating said carrier sheet in said first direction in predetermined relationships with respect to said carriage and said base, and means for setting the position of an edge of said sign blank in said first direction relative to the positions of said baselines of said characters on said carrier sheet.

Using prior art techniques, an architect may have to specify a large amount of font size and spacing data to a sign-maker to order the signs required for a building. The production of signs could be appreciably expedited if the architect could instead merely select a sign having font sizes and spacings deemed attractive from a catalog, giving only a catalog number and desired sign wording to a sign-maker, and yet be assured that signs having the same appearance would result. Also, it is often desired that signs be made by a sign-maker using the same font sizes and vertical spacing as were previously provided on signs made by a different sign-maker. Another object of the invention is to provide apparatus which will enable a sign-maker to rapidly and accurately make pressure-transferred signs having a variety of different "standard" font sizes and spacings, so that orders can be conveniently transmitted and accurately executed, and so that new signs can be readily made to be compatible with earlier-made signs.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed descriptipn taken in connection with the accompanying drawings, in which:

FIG. 1 is a semi-diagrammatic plan view illustrating one form of apparatus constructed in accordance with the present invention.

FIG. 1*a* is an enlarged view of one portion of FIG. 1.

FIGS. 2*a* to 2*f* are diagrams illustrating various rows of characters and useful in understanding various problems associated with sign-making.

FIG. 3*a* is a geometrical diagram illustrating certain features of one form of transfer letter sheets constructed according to the invention.

FIG. 3*b* is a geometrical diagram useful in understanding the invention.

FIG. 4 illustrates several sections of a tape used in a preferred embodiment of the invention.

FIGS. 5*a* and 5*b* are partial plan and elevation views respectively illustrating details of one form of cursor-rack arrangement which may be used with the invention.

FIGS. 6*a* and 6*b* are side and end cross-section views illustrating details of one form of tape guiding arrangement which may be used with the present invention; and FIG. 6*c* is a cross-section view illustrating an alternative form of vertical row-spacing indicator means.

Figure 9A:
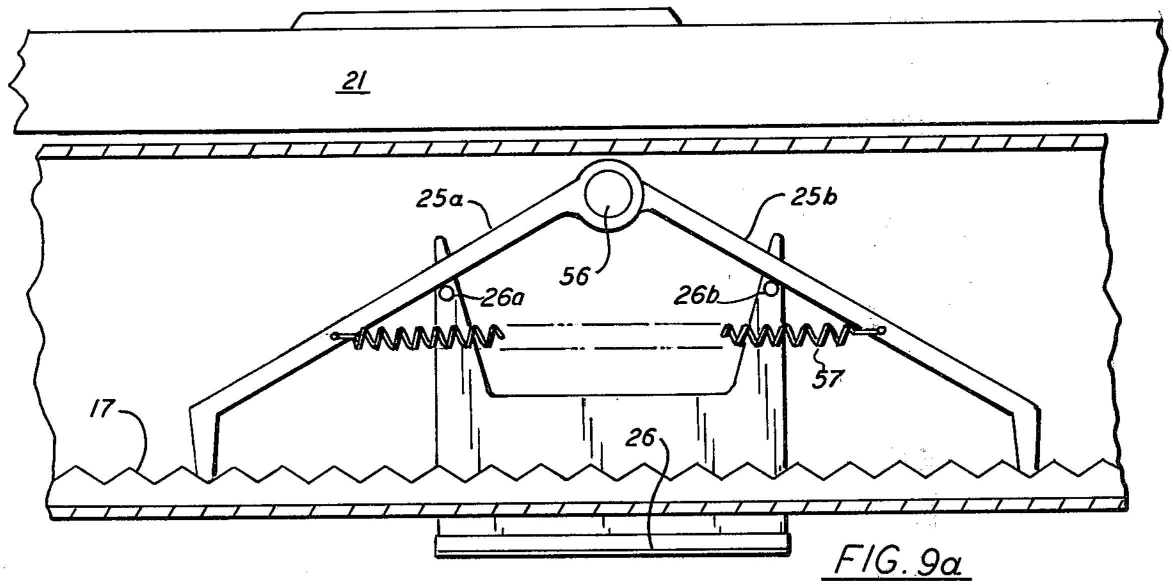
Figure 9B:
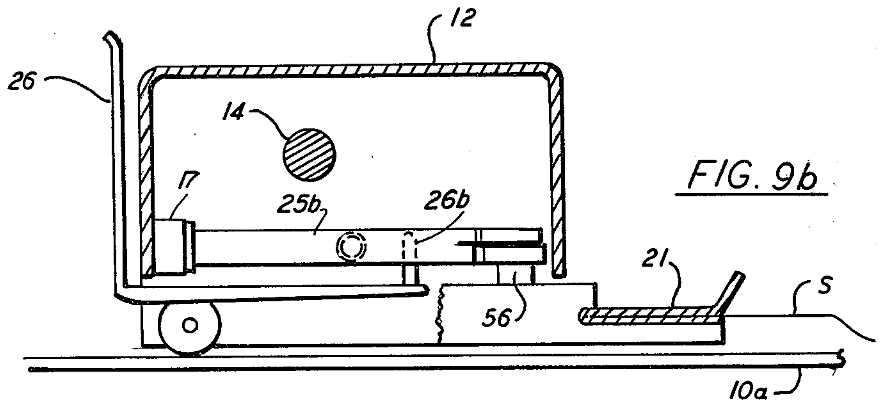

FIGS. 9*a* and 9*b* are diagrammatic cross-section views illustrating one form of carriage detent means which may be used with the present invention.

Figure 2A:
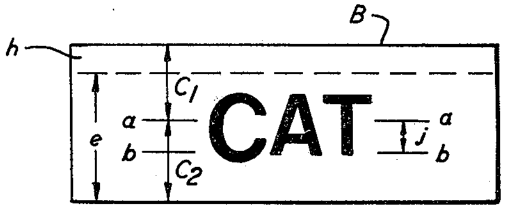

In FIG. 2*a* three upper-case characters of a given nominal size of a font known as Helvetica Medium are shown aligned in a row. The size of a group of characters intended to be used together is usually stated in terms of the approximate height of most of its upper case characters, and is termed nominal because some of the characters may have substantially different heights. Line b—b constitutes the baseline for the characters. Fonts are designed so that the baselines of all characters in a row are intended to coincide. Line b—b coincides with the lower extremities of flat-bottomed characters, such as the A and T shown, but passes through round-bottom characters slightly above their lower extremities, as in the case of the letter C shown. With some letters extending slightly below their baselines and others of the same nominal size and case not so extending, it will be apparent that one cannot merely align lower extremities of characters to provide a properly appearing sign.

Line a—a is shown located midway between the upper and lower extremities of the letters A and T, and substantially midway between the upper and lower extremities of the letter C. Line a—a constitutes what may be termed the apparent vertical centerline of the row of upper-case characters shown in FIG. 2*a*. The apparent vertical centerline of the row in FIG. 2*a* is not established with complete mathematical precision, its location being slightly subjective. One might instead deem it to lie midway between the upper and lower extremities of the letter C. In any event, when a row of upper-case characters is placed on a sign blank, such as that represented by rectangle B, almost all persons will agree that some apparent vertical centerline approximately midway between the upper and lower extremities of most of the characters should lie midway between the upper and lower edges of the sign blank, i.e. that dimension $c_1$ equal dimension $c_2$ in FIG. 2*a*, so that the row of characters will be visually centered on the sign. If a sign-holder will obscure a strip portion h when the sign is placed in use, the row of characters should be moved down so that the apparent vertical centerline a—a lies midway between the upper and lower edges of the remaining sight, which is shown having height e in FIG. 2*a*. If plural rows of upper-case characters are used on a sign, it is deemed desirable for an attractive appearance, that their apparent vertical centerlines be equally spaced apart, and that the apparent vertical centerlines of the uppermost and lowermost rows be spaced equal respective distances from the upper and lower edges of the eventual sight of the sign blank. Any row of upper-case characters of a given font and nominal size, and any character of that row, can be deemed to have a specific vertical distance between its baseline and its apparent vertical centerline, and in FIG. 2*a* that distance is shown by dimension j.

Figure 2B:
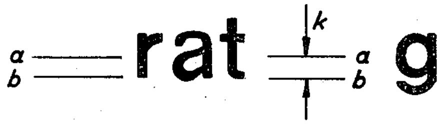

FIG. 2*b* illustrates a row of lower-case charcters from the same font and nominal type size as those in FIG. 2*a*. The intended or accepted baselines of all of the lower-case characters are shown aligned on line b—b, some lower-case characters, such as the "g" shown extending below their baselines. The apparent vertical centerline of the row of lower-case characters is shown by line a—a in FIG. 2*b*. Because lower-case characters are in general not as tall as upper-case characters, the distance (dimension k in FIG. 2*b*) between the baseline and the apparent vertical centerline is somewhat less than dimension j in FIG. 2*a*. The exact location of the apparent vertical centerline of a row of lower-case characters is also slightly subjective. As with upper-case characters, the eye perceives a row of lower-case characters to be centered on an apparent vertical centerline, and hence the spacing of rows formed of all lower-case characters should also be based on the apparent vertical centerlines of such rows. Thus if the lower-case characters of FIG. 2*b* were to be placed on the sign blank B of FIG. 2*a* in lieu of the upper-case characters thereshown, their baseline should be above the baseline shown for the upper-case characters.

Figure 2E:
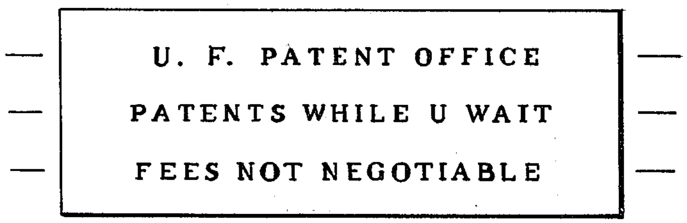
Figure 2C:

FIG. 2*c* illustrates a "mixed" row of characters of the same nominal sizes and font as that of FIGS. 2*a* and 2*b*, the row having an initial upper-case character P followed by a plurality of lower-case characters, all the characters having their baselines aligned on line b—b. The apparent vertical centerline of a row containing both upper case and lower case characters might conceivably be deemed to lie above the baseline by a distance which is some form of average between dimensions j and k of FIGS. 2*a* and 2*b*. However, from visually inspecting a large number of signs, it is my belief that the visual or apparent vertical centerline perceived by most persons for such a mixed row substantially corresponds with that of a row of all lower-case characters. This is probably because most signs contain words, most words contain more than two characters, and upper case characters are usually used only as the initial characters of words having both upper and lower case characters in the English language and many other languages, so that rows containing both upper-case and lower-case characters ordinarily have more characters of lower case than of upper case. Accordingly, in the row of mixed upper and lower case characters in FIG. 2*c* the apparent vertical centerline can be deemed to lie distance k above the baseline, just as in FIG. 2*b*, and the present invention operates with that assumption. Thus one can summarize as follows: The apparent vertical centerline of a row may be deemed to lie at one distance k above the baseline of the characters if the row contains any lower case characters, but lies higher at distance j above the baseline of the characters if the row contains only upper case characters. Stated in another way, one should use the apparent centerlines of upper case characters to vertically locate the characters if a row is to contain only upper-case characters, but otherwise ignore those centerlines and instead use the apparent centerlines of lower case characters.

It is important to note that the apparent centerline to baseline distances j and k shown in FIGS. 2*a* to 2*c* relate to only characters having the nominal size shown in those Figures, and larger or smaller characters will have larger or smaller j and k distances. If a method and apparatus are to be useful with plural sizes of characters, say sizes labelled #1 and through #4, the method and apparatus must accommodate use of any one of four sets of j and k distances.

Figure 2D:

In FIG. 2*d* the second "e" is shown having a rather gross upward translational mis-registration, i.e. its baseline is above those of the other characters, and the second upper-case "F" is shown with a gross rotational misregistration. Under the standards of most professional signmakers and architects, a translational mis-registration any more than 1.5 percent of character height, or a rotational mis-registration exceeding 0.75 degree, would render a sign unacceptable.

Figure 2F:

If a sign is to carry an odd number of rows of characters, it is usually desired that the apparent vertical centerline of the middle row lie on the vertical centerline of the eventual sight of the sign, as is illustrated in FIG. 2*e*, while if a sign carries an even number of rows, as in FIG. 2*f*, it is instead desired that a pair of middle rows be spaced equal distances above and below the vertical centerline of the eventual sight of the sign. The types of vertical spacing shown in FIGS. 2*e* and 2*f* will be referred to as odd spacing and even spacing, respectively. In addition to that difference between their vertical spacings, the signs of FIGS. 2*e* and 2*f* will be seen to differ in that much more vertical space is provided between successive rows in FIG. 2*e* than in FIG. 2*f*. That difference will be termed the breadth or narrowness of vertical spacing.

Figure 3B:
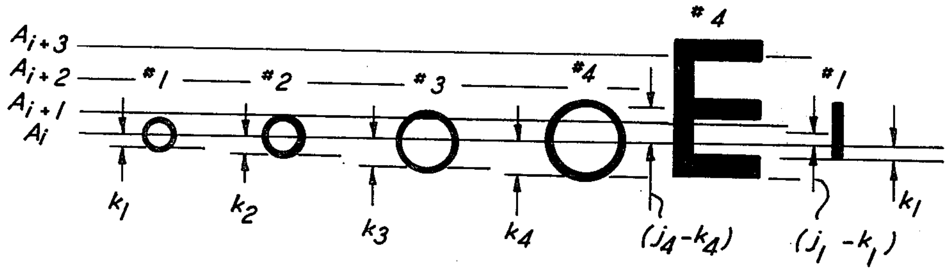
Figure 3A:
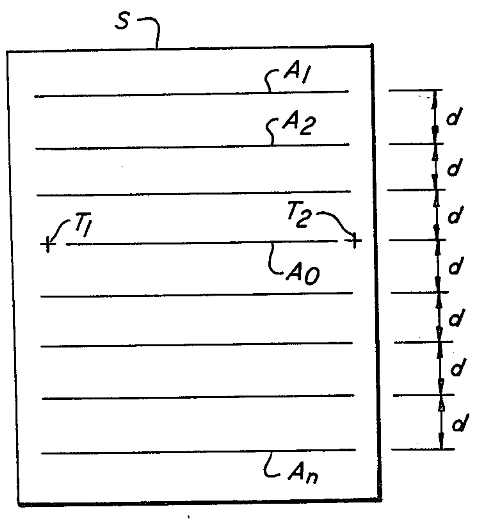

The method and apparatus of the present invention may be better understood by reference now to FIG. 3*a*. The letter carrier sheet S thereshown includes a pair of target marks $T_1$, $T_2$ defining an imaginary primary reference line $A_o$ extending horizontally across the sheet. The sheet can also be envisioned as having numerous further imaginary reference lines $A_1$ to $A_n$ each running parallel to line $A_o$ and each spaced a respective distance id therefrom, where i is an integer, and d is a predetermined distance which will be termed the incrementing distance, and which is described as 0.250 inch in an exemplary embodiment.

In accordance with a preferred embodiment of the invention, all lowercase characters are placed on such transfer sheets so that their apparent vertical centerlines are situated on one or another of the imaginary reference lines. In FIG. 3*b* four characters of different sizes intended to represent lwoer case o's are shown with their apparent centerlines alinged on the same imaginary reference line $A_i$. Such placement results in lowr case characters of sizes #1 to #4 having their baselines located respectively distances $k_1$ to $k_4$ below the reference lines on which their visual centerlines lie. Next, all upper case characters on all transfer sheets are vertically located so that their baselines either coincide with those of lower case characters of the same size or are displaced therefrom by a distance id. For example, the baseline of an upper case I of size #1 is shown distance $k_1$ below reference line $A_i$, while the baseline of an upper case E of size #4 is located distance $k_4$ below line $A_i$. Various characters of either upper or lower case, and particularly those of larger sizes, extend across one or more of the imaginary reference lines adjacent to the one to which their location is primarily referenced. For example, while all the characters in FIG. 3*b* are shown located with reference to imaginary line $A_i$, various of them extend across nearby lines $A_{i+1}$, $A_{i+2}$, etc. Thus the baseline of any character lies a distance $(id+k_m)$ from reference line $A_o$ on any transfer sheet, where m is the size number of the character, and it lies distance $k_m$ below some particular one of the reference lines. Because the visual centerline of an upper case character of a given size lies further up (dimension j in FIG. 2*a*) from its baseline than that of a lower case character, the visual centerlines of all upper characters lie slightly above various of the reference lines. For example, the visual centerline of the upper case I of size #1 lies distance $(j_1-k_1)$ above line $A_i$, and the visual centerline of the upper case E of size #4 lies distance $(j_4-k_4)$ above line $A_i$ in FIG. 3*b*. The illustration in FIG. 3*b* of characters of different nominal sizes located relative to line $A_i$ is not intended to imply that a given transfer sheet must carry characters of different nominal sizes. In general I prefer that a given transfer sheet carry only characters of one nominal size, through it is possible and within the scope of the invention to have characters of plural nominal size on the same transfer sheet. The targets $T_1$, $T_2$ preferably define a line somewhat near the vertical center of the sheet S as shown. The targets could instead define a line near the lower edge or the upper edge of the sheet, but defining a line near the center is preferred for the reason that vertical positioning errors due to stretching of the sheet then tend to be minimized. While all the imaginary lines $A_1$ to $A_n$ are shown in FIG. 3*a* spaced at integral multiples of distance d from the reference line $A_o$ defined by targets $T_1$ and $T_2$, it is quite possible to use an arrangement where all of them are vertically shifted some arbitrary distance a relative to line $A_o$, as will become clear below.

Figure 1:
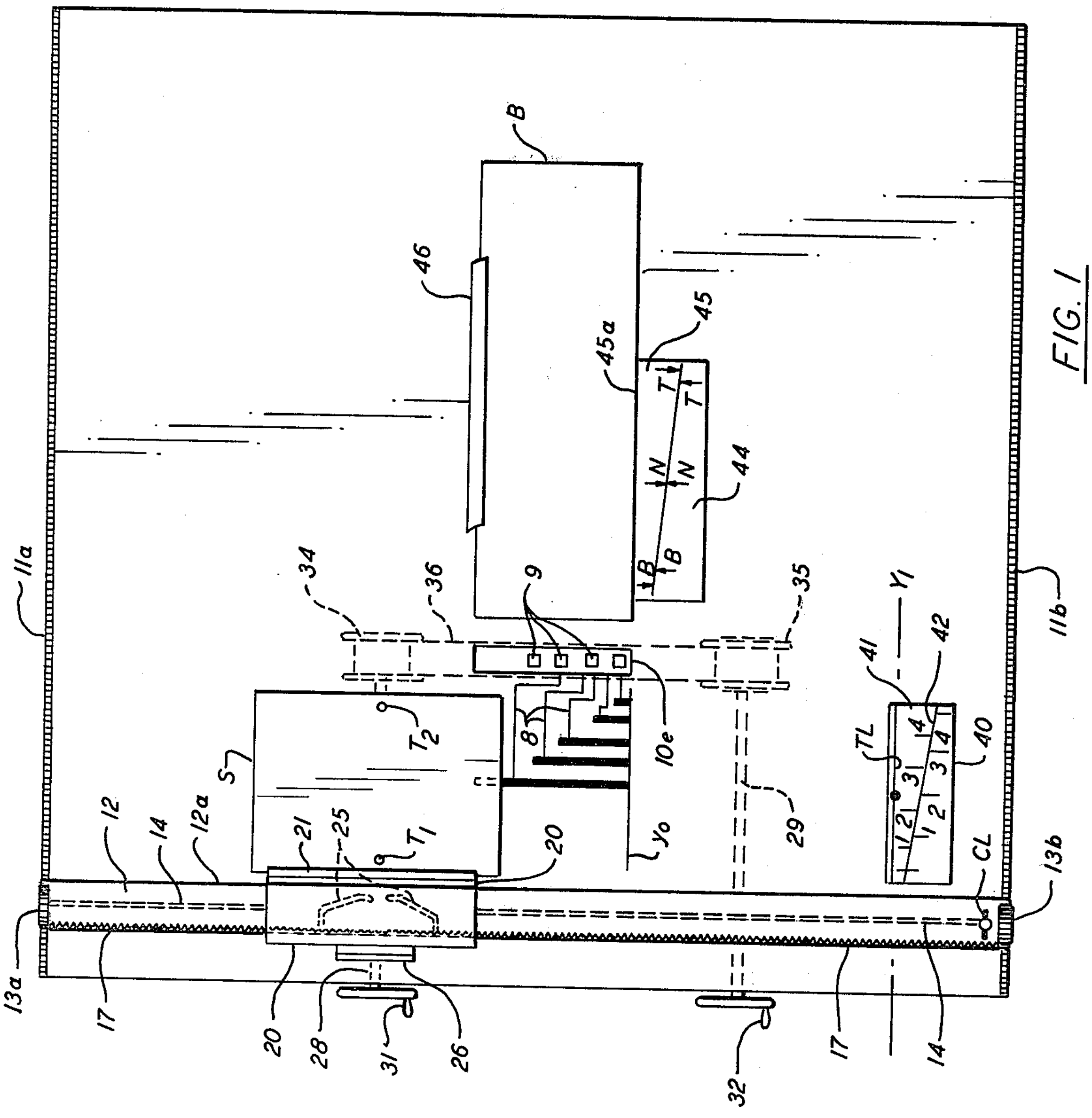

The invention can perhaps be best understood by consideration next of the semi-diagrammatic plan view of FIG. 1. The invention may include a generally flat base 10 which in some respects resembles a drafting board, and which may be supported atop a table or desk, or provided with legs (not shown) in the manner of some drafting boards. The left-right direction and the up-down direction in FIG. 1 will be termed X and Y directions, respectively. A cursor 12 extends across base 10 in the Y direction and is freely slidable across the base in the X direction except when locked in a given X position by cursor lock means CL. Gear racks 11*a* and 11*b* are affixed to and extend parallel to each other in the X direction across respective upper and lower edges of base 10. A shaft 14 extending inside the cursor and journalled therein carries pinions 13*a*, 13*b* on its ends, with the pinions engaging the racks 11*a*, 11*b* and insuring that both ends of the cursor travel the same distance, thereby maintaining an edge or surface 12*a* of the cursor aligned in the Y direction.

A further gear rack 17 is mounted inside the cursor to extend in the Y direction the entire length of the cursor. A transfer sheet carriage or chase 20 includes a spring-operated gripping means 21 for gripping the lefthand edge of a flexible transfer letter sheet S. The carriage preferably grips sheet S at a distance above the surface of base 10 approximating the thickness of the thickest sign blank to be used, such that the sheet may lie flat atop a sign blank B when the cursor is moved rightwardly from the position shown in FIG. 1. Carriage 20 is mounted on cursor 12 to be freely movable along the cursor in the Y direction whenever the operator pushes lever 26 to disengage a spring-biased detent means 25 which otherwise engages rack 17 and prevents movement of carriage 20 in the Y direction. The pitch of the teeth of rack 17 is chosen to establish a selected Y increment distance, such as 0.250 inch, this being the value referred to as d in the preceding discussion of FIGS. 3*a* and 3*b*. Whenever the operator releases lever 26, the detent means engages rack 17, constraining the carriage to move to the nearest one of a plurality of discrete Y positions spaced 0.250 inch apart, and preventing the carriage from occupying in some other Y position in between a pair of the discrete positions. Thus if the total range of travel of the carriage along the cursor is of the order of 16 inches, the carriage can occupy only something of the order of 64 evenly spaced Y positions. It is important that the detent means 25 engage the rack to fix the carriage Y position with no appreciable backlash or play, and important that rack 17 have uniform tooth pitch along its entire length. Various known forms of detent means may be used.

A pair of shafts 28, 29 journalled on base 10 to extend in the X direction may be rotated by cranks 31, 32 to rotate spools 34, 35 carried on the shafts, thereby reeling portions of a flexible tape 36 from one spool toward the other, and thereby positioning a selected section of the length of the tape below window or opening 10*e* where it may be viewed. Tape 36, as will be further explained below, carries a plurality of marks such as the rectangular boxes 9*a*–9*d* shown in FIG. 1*a*, with the heights of such boxes and spacings between boxes different along different sections of tape 36. In an alternative embodiment separate rigid strips are substituted for the continuous length of flexible tape. A plurality of index marks 8*a* to 8*e* inscribed atop base 10 at the edge of window 10*e* lead to sign blank height bars shown inscribed on base 10 in the manner of bar graph elements. The bottom edges of the bars depicted are all shown aligned on a reference line $Y_o$.

A pair of thin plates 40, 41 carried atop base 10 slidingly abut along a ine 42 which is canted from the X direction. The plates are each shown carrying five labelled index marks, and upper plate 41 also carries a target index line TL. The position of plate 40 on base 10 is fixed, and plate 41 is slidable against plate 40. When a sign is to be made with its row or rows having all lowercase characters or a mixture of lower-case and upper-case characters, the two plates are relatively positioned as shown so that their two left-most index marks (which are labelled preferably "Lower Case or Mixed" on actual apparatus) are registered, and target line TL will have a predetermined Y position. That position is labelled $Y_1$ for sake of explanation. The other index marks on the plates each relate to a respective one of four different nominal character sizes #1 to #4, which might be, for example $\frac{3}{8}$, $\frac{1}{2}$, $\frac{3}{4}$ and 1 inch nominal sizes. The pair of lines relating to the desired nominal character size are aligned with each other if the row or rows on the sign being made contains only upper-case characters. For example, if the $\frac{3}{8}$ inch or #1 size marks are aligned, target line TL will be moved distance ($j_1$–$k_1$) below line $Y_1$, while if the 1-inch or #4 size marks are aligned, the target line TL will lie distance ($j_4$–$k_4$) below line $Y_1$. As plate 41 is slid rightwardly to align different pairs of similarly-labelled index marks, target line TL will be moved downwardly to different Y positions below line $Y_1$. Thus plate 41 will be seen to form scale means for moving target line TL to different Y positions relative to line $Y_1$ in accordance with a selected character height or mix of character heights. As will be seen below, moving target line TL downwardly a given distance below line $Y_1$ later results in the transfer sheet which is used being mounted downwardly relative to carriage 20 by that distance. Various alternative means for positioning a transfer sheet relative to the carriage will be described below.

Respective edges of a further pair of thin plates 44, 45 carried on board 10 similarly engage each other along a line shown canted at an angle from the X direction. Each of these plates has a trio of index marks labelled "Bottom", "Neither", and "Top", pertaining to which edge, if either, of a sign to be lettered will be partially covered when the sign is put into use. If plate 45 is positioned in the centered position shown so that the two "Neither" marks register, the upper edge 45*a* of plate 45 will have one predetermined Y position on base 10, while sliding plate 45 rightwardly or leftwardly to register the "Bottom" marks or "Top" marks, respectively, will move edge 45*a* downwardly or upwardly, respectively, in any case keeping edge 45*a* aligned precisely in the X direction. Edge 45*a* comprises a reference edge against which sign blank B may be abutted and then temporarily affixed atop base 10, as by means of adhesive tape 46, for example, while a sign is being made. Thus plate 45 will be seen to comprise scale means for determining the Y position of an edge of a sign blank atop base 10 in accordance with the location of an edge of the sign which will later be occluded in use. In a typical application moving slide 45 from its centered position will shift the mounting position of the sign blank about $\frac{1}{4}$ inch. The use of single pairs of "Bottom" and "Top" marks assumes use of holders which will cover a known width of strip at the upper or lower edge of a sign. A plurality of additional scale marks (not shown) may be carried on plates 44 and 45 to allow edge 45*a* (and hence the sign blank B) to be positioned at various other positions to accommodate sign holders which cover different edge areas of signs. When slide 45 is in its centered "Neither" position, its edge 45*a* and the lower edge of sign blank B lie at reference line $Y_o$, the same Y position as the bottom of window 10*e* and the bottoms of the height bars shown. The heights of different standard size sign blanks preferred for use with the invention are each integral multiples of the increment-ing distance d, and in an exemplary embodiment those multiples are 3, 6, 18, 24 and 36. Each index mark of the group 8*a* to 8*e* (FIG. 1*a*) is inscribed above line $Y_o$ at a distance equal to one-half of the sign blank height with which it is associated. For example, index line 8*a* associated with signs 9 inches high lies 4.5 inches above line $Y_o$. It now will be seen that when a given size sign blank is abutted against edge 45*a*, its actual vertical centerline is aligned with the index mark associated with that size of sign blank assuming slide 45 is in the "Neither" position, and the vertical centerline of its eventual sight is associated with the index mark if slide 45 is in its "Top" or its "Bottom" position. Thus one of the index lines 8*a* to 8*e* always indicates the vertical centerline to be used for a sign blank affixed to base 10 if the sign blank has one of the five standard heights shown. The sign blank B is placed against edge 45*a* with its left edge on one of four left margin guidelines 7*a*–7*d*, each of which is labelled with a respective one of the four standard character sizes intended to be used.

Assume that target line TL lies at line $Y_1$, the situation when all lower-case or mixed lower case and upper case characters are to be used. If a transfer sheet is slidingly positioned in carriage 20, with the carriage detent engaged, until targets $T_1$ and $T_2$ on the transfer sheet are aligned on target line TL and then gripped by the carriage gripping means, one is assured that thereafter, whenever the detent means is engaged, that all of the imaginary lines $A_o$ to $A_n$ on the transfer sheet lie integral multiples of increment distance d from target line TL; and further, because the apparent vertical centerlines of all lower case characters are situated on various of those imaginary lines as previously explained, one is assured that those apparent centerlines lie integral multiples of increment distance d from target line TL. Still further, because the Y distances from line $Y_1$ to each of index marks 8*a* to 8*e* are all integral multiples of d, one is assured that if the carriage is vertically moved to place a lower case character on the transfer sheet substantially centered (say within 0.5d) over a selected one of those index marks and then detented, the apparent vertical centerline of that lower case character will then be exactly centered on the selected index mark. If the selected one of the index marks, say mark 8*a*, for example, coincides with the vertical centerline of the sight of sign blank B, it now will be apparent that one can readily position a row of lower case characters (or mixtures of lower case and upper case characters, which are assumed to have the same apparent centerlines), so that the apparent centerline of the row accurately coincides with the centerline of the sight of the sign.

Further, since the vertical centerlines of boxes 9*a* to 9*d* on tape 36 are spaced apart at distances which are integral multiples of increment distance d, it will become apparent that if the vertical centerline of box 9*b* is aligned with index mark 8*a* as shown, by moving the carriage and then detenting it, lower case characters (or mixtures of lower case and upper case characters) can be readily spaced along rows so that the apparent vertical centerlines of those further rows accurately coincide with the vertical centerlines of any of boxes 9*a*–9*d* on tape 36. Thus accurate odd vertical spacing is readily achieved. Still further, if "Even" mark 5 on tape 36 lies a distance from the centerlines of boxes 9*b* and 9*c* which is an integral multiple of distance d, and if that "Even" mark is aligned with a selected one of index marks 8*a* to 8*e*, it will be apparent that rows of lower case characters (or mixtures of upper and lower case) may be accurately spaced so that the apparent vertical centerlines of those rows lie equal distances above and below the selected index mark (of the group 8*a* and 8*e*), thereby providing "even" vertical spacing of rows on the sign blank.

If a transfer sheet is positioned in carriage 20 as was just described, by aligning its targets with target line TL when line TL lies at the $Y_1$ reference position, the apparent centerlines of lower case characters on the sheet are accurately positioned to lie at distances which are integral multiples of distance d from the reference marks 8*a* to 8*e*, but the apparent centerlines of upper case characters then will lie distances ($j_m$-$k_m$) above lines which lie at distances which are integral multiples of distance d. Thus when rows are to be formed of all upper case characters, so that strings of lower case characters do not dominate them to lower the overall apparent centerlines of the rows, proper vertical spacing of the apparent centerlines of such rows is assured by merely lowering target line TL a distance ($j_m$-$k_m$) below reference position $Y_1$, by sliding plate 41 to align the pair of index marks on plates 41, 42 pertaining to the nominal size of characters being used, and then when the transfer sheet targets are aligned with target line TL, the apparent centerlines of all upper case characters on the transfer sheet lie at distances from index marks 8*a* to 8*e* which are integral multiples of distance d, thereby vertically centering rows formed entirely of upper case characters.

In the foregoing description all of the imaginary reference lines on the transfer sheet with respect to which characters are located were said to lie distances id from line $A_0$ defined by targets $T_1$, $T_2$. With such an arrangement, characters may be located with respect to line $A_0$ in the same manner as with respect to the other imaginary lines. It is not necessary, however, that the target line $A_0$ lie distances id from the other imaginary lines. Assume, for example, that line $A_0$ lies a wholly arbitrary distance a equal to 0.030 inch below distances id from the other imaginary lines. Exactly the same results as those previously described will be obtained if, in addition, reference line $Y_1$ is merely moved downwardly the arbitrary distance 0.030 inch, so that line $Y_1$ lies 0.030 inch below distances which are id from reference line $Y_0$ and index marks 8*a* to 8*e*. With such an arrangement, all lower case character centerlines on a sheet will lie 0.030 inch above distances id from line $A_0$.

To illustrate typical operation of the invention, it will be assumed that three rows of one-inch or #4 size capital letters are to be placed on a 9-inch high sign blank which will be used in a bottom edge holder, that "wide" row spacing is to be provided, and that a 1-inch margin is to be provided at the left edge of the sign. The following simple procedure may be used.

Plate 45 is slid to register the pair of "Bottom" index marks, and the sign blank is butted against edge 45*a* and line 7*d* and taped to base 10. The vertical centerline of the "sight", or portion of the sign blank to be eventually displayed will then lie aligned with index mark 8*a*. Plate 41 is then slid to register the pair of 1-inch index marks. Cranks 31 and 32 are turned until a section of tape 36 labelled "1-inch wide" appears in window 10*e*.

Because an odd number (i.e. 3) of rows are assumed to be required and the sign blank to be used is 9 inches high, the centerline 6 (labelled "odd") of the selected section of tape 36 is aligned with the index line 8*a* leading from the 9-inch height bar to window 10*e*. Line 8*a* will be aligned with the center of the sight to be used on the 9-inch sign blank, and hence moving centerline 6 into alignment with index line 8*a* serves to vertically position the boxes 9*a*–9*c* at the same Y positions as the three rows of 1-inch characters should have on the sign blank. With the boxes 9*a*–9*d* on tape 36 then visible adjacent the left end of the sign blank, the operator is immediately afforded an indication of character size and vertical spacing which helps him visualize how the finished sign will look, allowing him to select another character size and/or spacing if that first selected seems to be vertically too crowded, for example. The cursor is then moved to the far left, the carriage moved downwardly, and the detent means engaged. The transfer letter sheet S is then inserted in the carriage, slightly shifted until the two targets $T_1$, $T_2$ on the letter sheet are vertically aligned on target line TL on plate 41, and then clamped in the carriage. Adjusting sheet S in the carriage to align its targets with target line TL on slide 41 insures that the apparent centerlines of all 1-inch nominal-size upper case characters carried on the sheet then lie either on various of the index lines 8*a*–8*d* or are vertically spaced therefrom by distances which are integral multiples of the Y incremental distance, 0.25 inch.

The cursor and carriage are next moved until the left edge of the first character to be transferred sits on the 1-inch margin guideline 7*d*, and a small pencil or pen "tick" mark is made on an edge of sheet S to coincide with the selected margin guideline. The cursor and carriage are then moved to position the first character above the box 9*a* visible on tape 36 through window 10*e*, (it being assumed that the uppermost of the three rows is to be formed first, which is not really a requirement). When that is done and the carriage release lever is released, the carriage may move some appreciable distance (e.g. 0.010 inch) one way or the other in the Y direction as the detent means 25 seats against rack 17. The cursor is then moved to the right until the tick mark registers with the selected margin guideline, the cursor is locked in place, and the first letter to be transferred is then in proper position to be burnished in place on the sign blank. Whenever the operator moves the cursor rightwardly so that the right edge of sheet S passes the left edge of the sign blank, he lifts the right edge of the transfer sheet so that it does not catch on the left edge of the blank.

After the first character in the first row has been transferred, the cursor and carriage then may be moved to position the second letter and successive letters of the first row at their correct Y positions over the sign blank without making any further vertical alignment operations other than the extremely simple one of insuring that a selected letter ready to be transferred is not vertically misplaced by one or more discrete Y increments, i.e. 0.25 inch or a multiple thereof in the exemplary embodiment. The operator can, of course, readily detect any such gross misalignment. The horizontal or inter-character spacing between letters along a line must be properly adjusted by the operator, of course, by proper X movement of the cursor.

After the first line of characters has been formed on the sign blank, the cursor and carriage are then moved to position the first character to be used in the second line above the next lower box visible on tape 36, and forming the second line follows the same procedure as that just described. The similar procedure for forming of the third line will be apparent without further explanation.

In the exemplary embodiment which provides for use of sign blanks as high as 9 inches and for use of four different character heights (nominally 0.35, 0.50, 0.71 and 1.0 inches) window 10*e* has a Y dimension approximating 9 inches, and tape 36 has 8 sections, arranged in series along the tape, with each section being approximately 9 inches long and having "odd" and "even index lines of the nature of those shown at 5 and 6 in FIG. 1. Two such sections of tape are preferably provided for each character height, one section relating to "wide" interline spacing and the other relating to "narrow" interline spacing, although sections for various other interline spacings also may be provided, as will be explained.

Figure 1A:
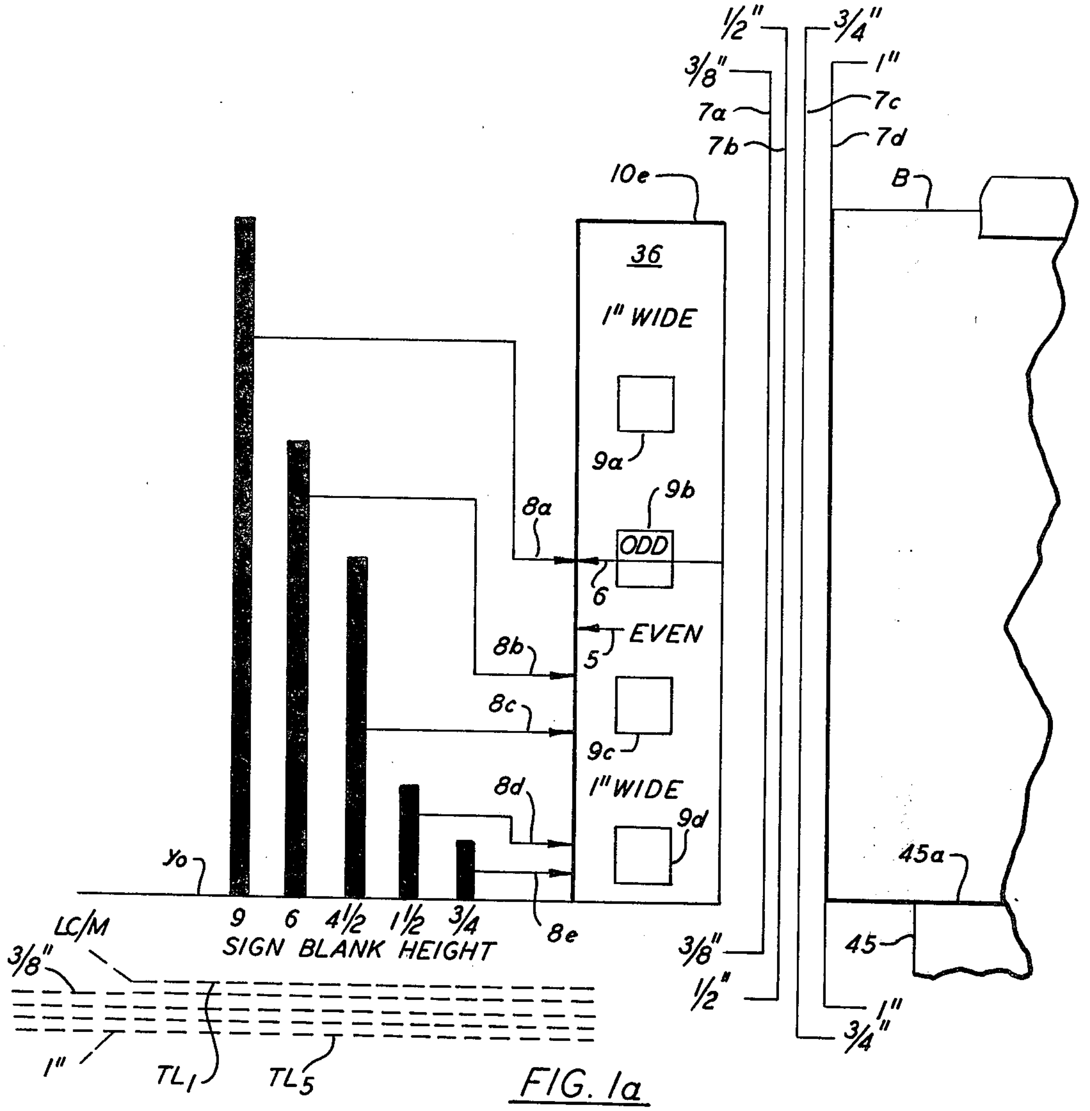
Figure 4:
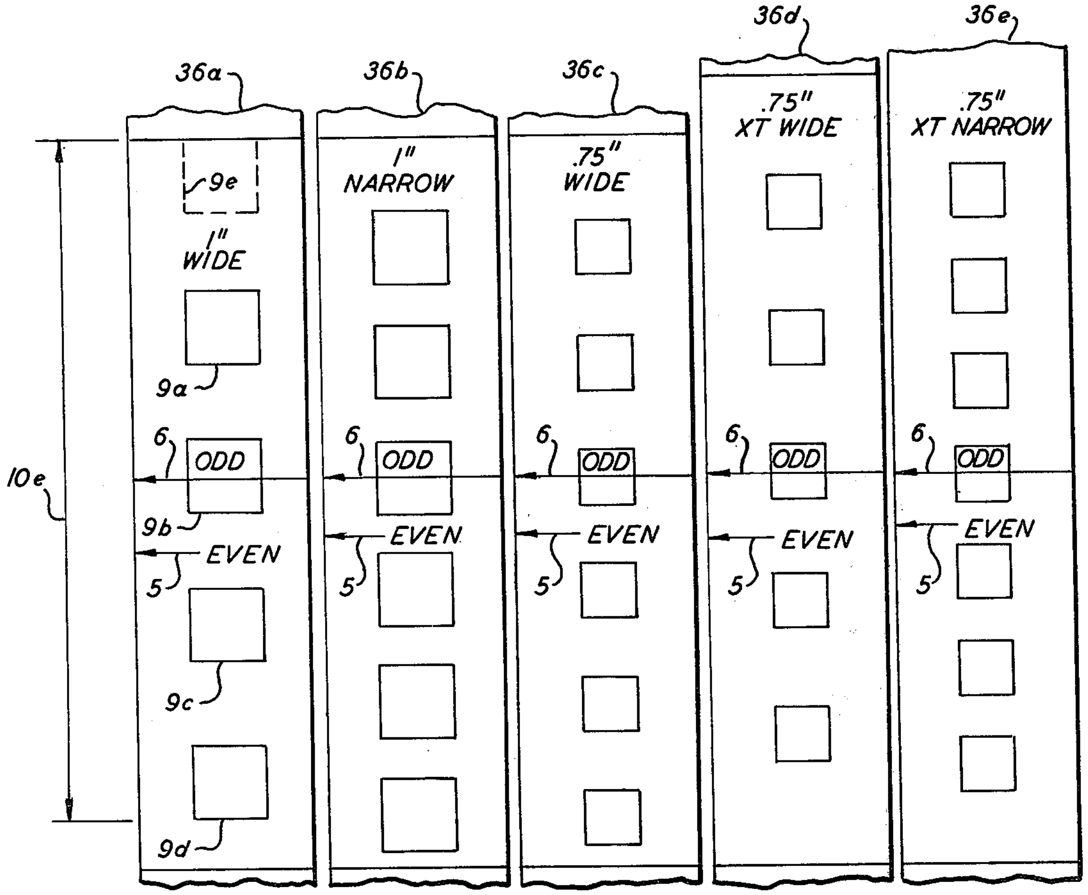

FIG. 4 illustrates five exemplary sections of tape 36 shown horizontally aligned with a dimension 10*e* representing an edge of window 10*e*. Section 36*a* which is also shown in FIG. 1*a*, is labelled "1-inch, Wide", and is shown containing four boxes *9a–9d* each assumed to be 1-inch high, and with "wide" inter-row spacing. Importantly, the vertical centerlines of all of boxes *9a -9d* lie vertically spaced apart at distances which are integral multiples of the incrementing distance d. As many 1-inch high boxes with such spacing as can be fitted in the Y dimension (assumed to be 9 inches) of the largest sign blank to be used, without equalling that Y dimension, are preferably provided. It may be noted that a further box 9*e* shown in dashed lins could be provided on section 36*a*, but that use of 5 lines of 1-inch characters with such 1-inch spacing would result in no upper and lower margins being provided on a 9-inch high sign. Since such a sign is deemed unacceptable, box 9*e* is not carried on tape section 36*a*.

Tape section 36*b* carries boxes for 1-inch high characters having "narrow" inter-row spacing, so that one-half inch spaces are provided between adjacent pairs of boxes in section 36*b*. Tape section 36*c* carries boxes for characters of 0.75 inch nominal height, with "wide" inter-row spacing, so that 0.75 inch spaces are provided between adjacent pairs of boxes in section 36*c*. Tape section 36*d* is shown as carrying boxes each 0.75 inch high with what may be termed "extra-wide" inter-row spacing, and is shown with 1-inch spacing between adjacent pairs of boxes. Tape section 36*e* is shown carrying boxes each 0.75 inch high with what may be termed "extra-narrow" inter-row spacing, which is shown as one-half inch spaces between adjacent pairs of boxes. It will be apparent that further generally-similar sections can be provided along the length of tape 36 having yet further types of inter-row spacing. Significantly, the distance from the bottom, centerline or top of any box in a given section of tape to the bottom, centerline or top of any other box in that section, is an integral multiple of the Y increment distance (assumed to be 0.250 inch) of the carriage 20 on the cursor 12.

The central box, if an odd number of boxes is provided in a section as is the case shown for sections 36*d* and 36*e*, or one of the central pair of boxes if an even number are provided, as for sections 36*a*–36*c*, has an index mark 6 labelled "odd" passing through its vertical center and each tape section has an "even" index mark 5 spaced vertically from the odd index mark at a distance which is an integral multiple of the incrementing distance d. If any or the tape sections shown in FIG. 4 is reeled so that part or all of the section is visible in window 10*e*, and either its odd index line 6 or its even index line 5 is aligned with any one of the index lines 8*a* to 8*e*, the vertical centerlines of all of the boxes of the tape section will lie at Y distances from reference line $Y_0$ which are integral multiples of the Y increment distance.

Figure 5A:
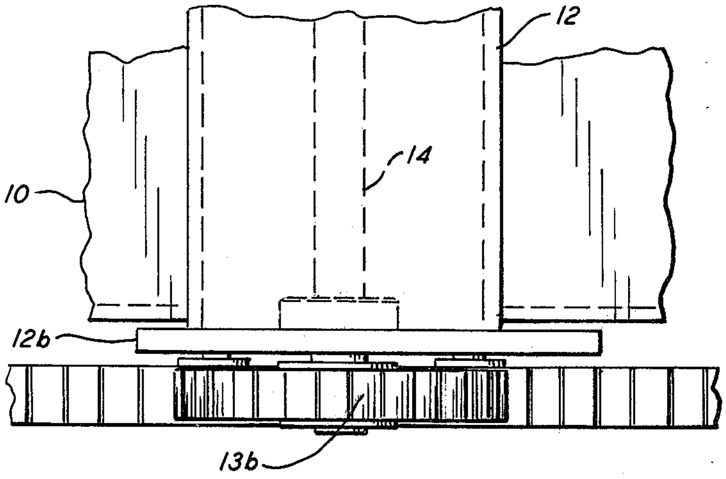
Figure 5B:
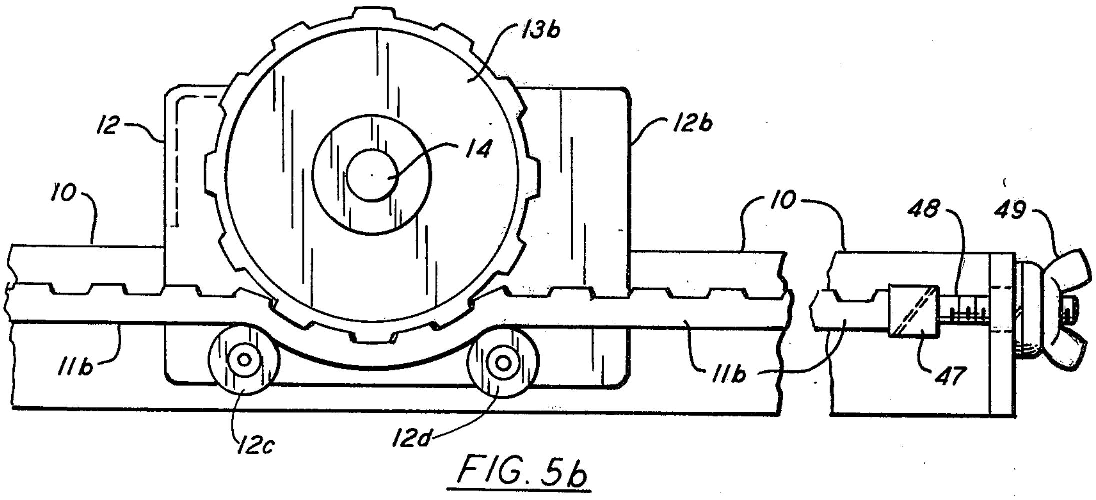

FIGS. 5*a* and 5*b* illustrate an exemplary arrangement for providing rack 11*b* along the lower edge of table 10. Shaft 14 which extends through cursor 12 above the upper surface of table 10 carries a plastic pinion 13*b* on its end, the teeth of which engage a taut length of rubber drive belt 11*b* which acts as a rack. Plate 12*b* affixed to the lower end of cursor 12 carries a pair of rollers 12*c*, 12*d* which maintain belt 11*b* engaged with pinion or drive wheel 13*b*. A clamp 47 crimped around one end of rack-belt 11*b* carries a threaded bolt 48 which is shown engaged by a wing-nut 49 allowing the tension in belt 11*b* to be adjusted. The other end of belt 11*b* may be fixedly attached to the lower left edge of table 10. Upper rack 11*a* may comprise a similarly operating section of drive belt. Rigid metal or plastic racks can instead be arranged to extend along the upper and lower edges of table 10, but the rubber drive belt arrangement shown is preferred because of its modest expense.

Figure 6A:
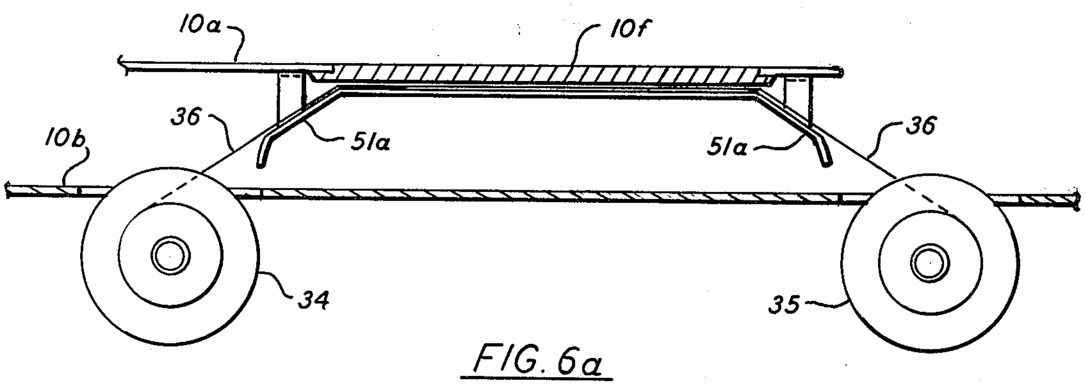
Figure 6B:
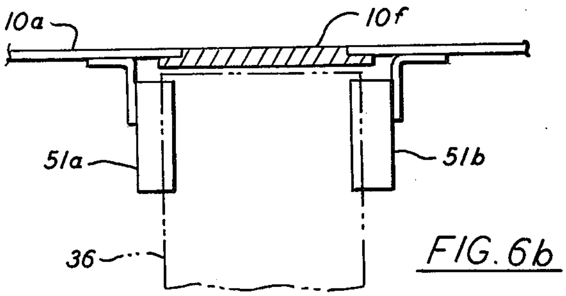

As illustrated in FIGS. 6*a* and 6*b* film or tape 36 extends between reels 34 and 35, passing over the edges of guide plates 51*a*, 51*b* which train the tape up to a position just below window 10*e*, which preferably carries a transparent plastic or glass insert 10*f* to protect the tape from accidental damage. Guide plates 51*a*, 51*b* are affixed to the bottom of upper plate 10*a* of base 10.

Figure 6C:
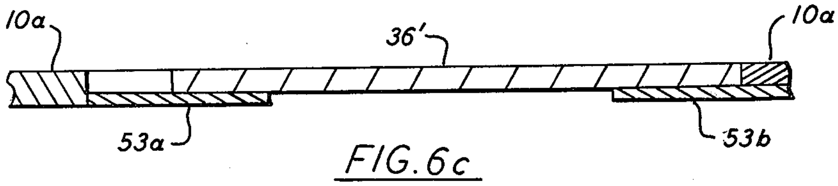

In embodiments which use the modification illustrated in FIG. 6*c*, where separate rigid plastic strips 36′ are used in lieu of tape 36 and the pair of reels, the opening in the upper plate 10*a* of base 10 preferably has shelf portions 53*a* and 53*b* for supporting the edges of each plastic strip 36′ carrying space indicia. The Y position of a strip 36′ can be accurately shifted to provide odd or even spacing.

It is important to note that the use of a movable target line TL such as that shown carried on plate 41 in FIG. 1 is not strictly necessary. A modification is illustrated by target lines $TL_1$ to $TL_5$ shown in FIG. 1*a* in dashed lines. If a plurality of such lines are inscribed on the upper surface of base 10 at appropriate vertical locations, the operator may align the targets $T_1$ and $T_2$ on a transfer sheet with a selected one of those lines rather than with the line $TL_1$. The line $TL_1$ in FIG. 1*a* should be a vertical distance id from line $Y_0$, and the other target lines should be spaced distances $j_1-k_1$, $j_2-k_2$, etc., below lines which are distances id from line $Y_0$. Lines $TL_1$ to $TL_5$ preferably extend horizontally the entire width of each transfer sheet to facilitate accurate alignment of a transfer with any selected one of them.

Figure 7:
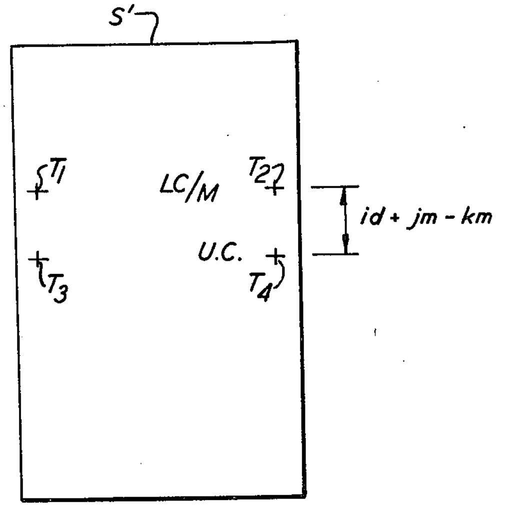
FIG. 7 is a diagram illustrating an alternative form of carrier sheet.

In an alternate system of the invention partially illustrated by FIGS. 7, no movable target line akin to line TL on slide 41 need be provided. Instead, a fixed line on base 10, such as the line shown at $Y_0$ in FIG. 1 is used, and one or another of two reference lines on a given carrier sheet is aligned with line $Y_0$, to fix the vertical position of the sheet relative to carriage 20, depending upon whether or not the sign is to use all upper case characters. In FIG. 7 targets $T_1$ and $T_2$ define a first reference line across carrier sheet S′ and targets $T_3$ and $T_4$ define a second reference line. Each sheet carries only characters of one nominal size, though it may carry both upper case and lower case characters of that size, of course. The characters on each sheet, as in the previous example, are all positioned so that their baselines all lie distance id vertically apart. The reference line on each sheet used when all upper case characters are to be formed is shown lying distance ($id \neq j_m - k_m$) below that used for lower case or mixed rows. Thus on a sheet carrying all size #1 characters, for example, one reference line lies distance ($id \neq j_1 - k_1$) below the other, on a sheet carrying all size #2 characters one reference line lies distance ($id \neq j_2 - k_2$) below the other, etc. The reference line used for making a sign with all upper case characters can lie above the other reference line on the sheet, by merely assuming i to be a negative integer, of course.

Figure 8:
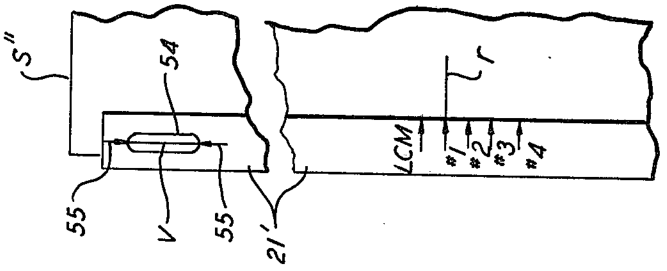
FIG. 8 is partial plan view illustrating an alternate arrangement for aligning a carrier sheet in the carriage of the invention.

It is not strictly necessary that a reference line defined on each transfer sheet be aligned with a target line on base 10 per se. In FIG. 8 the portion 21' of carriage 20 which grips a transfer sheet carries a plurality of vertically spaced index marks, a selected one of which a reference line r on transfer sheet S'' is aligned with. The upper left corner of the transfer sheet also carries a vertical line V which appears through a slot 54 in gripping means 21' so that it may be aligned with index marks 55 on the gripping means, insuring that the sheet is positioned in the gripping means so that all character baselines extend precisely in the X direction.

FIGS. 9*a* and 9*b* semi-schematically illustrate the principles of one form of carriage detent mechanism, with various portions omitted for sake of clarity. The carriage 20 has a member extending below one side of cursor 12 to pivotally support a pair of detent arms 25*a*, 25*b* on a pin 56. Tension spring 57 tends to pull the arms together, forcing their ends into a pair of the tooth recesses of rack 17 extending along the cursor, and thereby preventing Y movement of the carriage. Handle 26 carries a pair of pins 26*a*, 26*b* which engage arms 25*a*, 25*b* to slightly spread the arms apart and clear their ends from the rack when handle 26 is pushed inwardly, allowing the carriage to be moved in the Y direction.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustraive and not in a limiting sense.

The embodiments of the invention in which an exclusive property or privilege is claimed are defined as follows:

1. Apparatus for forming signs which aids an operator to form an operator-selectable number of rows of operator-selectable characters of an operator-selectable height on a sign blank having a height selectable by the operator from a plurality of different sign blank heights, by transfer of successive characters from a carrier sheet carrying said characters, with said rows of characters having operator-selectable predetermined spacings between rows and operator-selectable predetermined spacings relative to a pair of edges and a centerline of said sign blank, comprising, in combination: a base having a surface for supporting said sign blank and means for locating one of said edges of said sign blank relative to said base in a predetermined reference position in a first direction; a carriage mechanism carried on said base including a carriage having means for gripping said carrier sheet and means for constraining movement of said carriage to a plurality of predetermined discrete positions relative to said base, said discrete positions being spaced apart a predetermined incremental distance in said first direction; and means for positioning said carrier sheet in said first direction to an operator-selectable gripping position relative to said carriage and said base so that movement thereafter of said carriage to various of said discrete positions will locate characters on said sheet in said first direction in accordance with said predetermined spacings.

2. Apparatus according to claim 1 wherein said carrier sheet carries indicia defining a reference line across said sheet and said means for positioning said carrier sheet comprises target indicator means with which said indicia on said sheet may be registered to position said carrier sheet in said gripping position.

3. Apparatus according to claim 1 having a plurality of spacing indicator strips each carrying indicia representing a respective combination of character height and row spacing in said first direction, and means for positioning an operator-selected one of said strips adjacent an end of said sign blank in a predetermined position relative to said base to afford an indication of how character rows using the combination of character height and row spacing on said one of said strips will fit on said sign blank.

4. Apparatus according to claim 1 wherein said plurality of sign blank heights are each integral multiples of said incremental distance.

5. Apparatus according to claim 1 wherein said carrier sheet carries rows of characters having character baselines spaced apart at integral multiples of said incremental distance.

6. Apparatus according to claim 1 wherein said means for locating one of said edges of said sign blank comprises stop means having an edge against which said one of said edges of said sign blank may be abutted, said stop means being slidably movable atop said surface, and cooperating index indicia on said stop means and said base to indicate positioning of said edge of said stop means at a plurality of predetermined positions.

7. Apparatus according to claim 1 wherein said one of said carrier sheets carries indicia defining two reference lines across said sheet, said reference lines being spaced apart in said first direction at a distance which is an integral multiple of said predetermined incremental distance plus the difference between the baseline to apparent centerline distance of upper case characters on said one of said sheets and the baseline to apparent centerline distance of lowercase characters on said one of said sheets.

8. Apparatus according to claim 2 wherein said target indicator means is mounted on said base for movement in said first direction relative to said base, and said apparatus includes cooperating index means on said stop means for indicating movement of said target indicator means to each of a plurality of predetermined positions relative to said base.

9. Apparatus according to claim 3 wherein said plurality of spacing indicator strips are joined end to end to form a continuous strip, wherein said base includes a window, and wherein said means for positioning one of said strips comprises reel means for positioning a selected section of said continuous strip to be visible in said window.

10. Sign-making apparatus for forming one or more rows of characters on sign blanks in predetermined positions relative to the upper and lower edges and centerlines of said sign blanks by transfer of successive characters from carrier sheets, said sign blanks having a plurality of different predetermined heights and each having a reference edge, said apparatus comprising, in combination: a base having a generally planar surface; blank locator means for locating any one of said sign blanks on said surface with the reference edge of said sign blank in a predetermined position measured in a first direction with the height dimension of said sign blank extending in said first direction; indicator means mounted on said base and having a plurality of space and height indicator sections selectively positionable to a predetermined position in said first direction relative to said base adjacent an end of said sign blank, each of said indicator sections carrying a pattern of indicia representing a respective combination of heights and spacings of rows of characters, whereby positioning a selected one of said indicator sections to said predetermined position will provide a preview of how rows of characters of a particular height and having a particular spacing will appear on said sign blank; and a carriage mechanism for locating a carrier sheet relative to said base so as to locate characters on said sheet in predetermined positions in said first direction relative to said base and a selected one of said indicator sections.

11. Sign-making apparatus according to claim 10 wherein said carriage mechanism comprises a carriage having means for clamping an edge of a carrier sheet, and means for constraining positioning of said carriage relative to said base in said first direction to a plurality of discrete positions spaced apart a predetermined incremental distance.

12. Sign-making apparatus for forming one or more rows of characters on sign blanks by transfer of successive characters from carrier sheets, said sign blanks having a plurality of different heights and each having a reference edge, said apparatus comprising, in combination: a base having a generally planar surface for supporting a sign blank and a stop means against which said reference edgeof said sign blank may be abutted to locate said sign blank atop said surface at a predetermined location measured in a first direction relative to said base; a carriage for gripping one of said carrier sheets; a carriage travel mechanism carried on said base to allow movement of said carriage relative to said base in said first direction and a second mutually-perpendicular direction, said mechanism including means for constraining movement of said carriage in said first direction to a plurality of predetermined discrete positions relative to said base and spaced apart a predetermined incremental distance, each of said carrier sheets carrying rows of characters having baselines of characters in different rows spaced apart by integral multiples of said incremental distance and carrying means defining a reference line; and index means cooperating with the reference line on a carrier sheet to indicate a plurality of different predetermined positions measured in said first direction at which a carrier sheet should be gripped by said carriage.

13. Apparatus according to claim 12 wherein said index means comprises a target means slidable atop said base, and scale means for indicating predetermined positions of said target means in terms of a plurality of different character sizes.

14. Apparatus according to claim 12 wherein said carriage includes means for clamping a carrier sheet along one edge of said sheet and said index means comprises a plurality of marks carried on said means for clamping.

15. Apparatus according to claim 12 which includes a plurality of spacing indicator means, each of said spacing indicator means carrying a plurality of indicia having heights representing the heights of characters, said indicia being spaced apart in said first direction at integral multiples of said incremental distance, and each of said spacing indicator means being selectably positionable adjacent a sign blank supported on said base to afford a preview of the spacing which use of characters of a given size and inter-row spacing will provide on said sign blank.

16. Apparatus according to claim 12 wherein said carriage travel mechanism comprises first and second racks spaced apart and extending along said base in said second direction, a cursor member extending in said first direction, first and second pinion means journalled on said cursor member and engaging said first and second racks, respectively, and shaft means interconnecting said pinion means.

17. Apparatus according to claim 12 wherein said carriage travel mechanism includes a cursor member extending across said base in said first direction and movable across said base in said second direction; and wherein said means for constraining movement of said carriage comprises a rack carried on and extending along said cursor member in said first direction, detent means carried on said carriage, spring means normally urging said detent means to engage said rack, and operator-control means for momentarily disengaging said detent means from said rack to allow movement of said carriage.

18. Apparatus according to claim 15 having an index mark on each of said spacing indicator means, and a cooperating index mark carried on said base, said index marks being located on said spacing indicator means and said base so that movement of said spacing indicator means to cause registration of said index marks centers said plurality of indicia in said first direction relative to said sign blank.

19. Apparatus according to claim 15 having means for indicating the positioning of any of said spacing indicator means in said first direction to either a first position at which a centerline through one of said indicia is coincident with the centerline in said first direction of said sign blank, or to a second position at which a centerline midway between an adjacent pair of said indicia is coincident with said centerline of said sign blank.

20. Apparatus according to claim 15 wherein said plurality of spacing indicator means comprise successive sections of a flexible tape, and wherein said apparatus includes reel means carried on said base for selectably positioning individual sections of said tape adjacent said sign blank.

21. Apparatus according to claim 15 wherein said plurality of spacing indicator means comprise a plurality of rigid strips, and said base includes means for supporting any of said strips in a predetermined position relative to said base in said first direction.

22. In sign-making apparatus for forming one or more rows of characters on a sign blank by transfer of successive characters from a carrier sheet and which includes a base for supporting said sign blank, a carriage adapted to hold a carrier sheet carrying rows of transferable characters, and means for constraining movement of said carriage in a first direction to a plurality of positions spaced apart at an incremental distance, the improvement which comprises means for positioning said sheet relative to said carriage so that if the apparent centerlines of the characters of said rows on said sheet are spaced apart at in tegral multiples of said incremental distance said centerlines will lie along a plurality of predetermined lines spaced apart in said first direction, and means for locating said sign blank on said base so that the centerline in said first direction of said sign blank lies either on one of said predetermined lines or an integral multiple of said incremental distance therefrom.

23. Apparatus according to claim 22 wherein said means for positioning said sheet relative to said carriage comprises index means carried on said base and defining a reference line with which an index line on said sheet may be registered.

24. Apparatus according to claim 22 wherein said means for positioning said sheet relative to said carriage comprises a plurality of index lines on said carriage with which index lines on said sheet may be registered.

25. Apparatus according to claim 22 wherein said means for locating said sign blank comprises stop means against which an edge of said sign blank may be abutted.

26. Apparatus according to claim 22 which includes a plurality of spacing indicator means, each of said spacing indicator means carrying a pattern of indicia representing characters of a respective height and respective spacing in said first direction and means for positioning the spacing indicator means in at least one predetermined position relative to said base.

27. Apparatus according to claim 23 having means for moving said index means to a plurality of predetermined different positions to vary the position of said sheet relative to said carriage for different sizes of characters.

28. Apparatus according to claim 23 having means for moving said index means to a plurality of predetermined different positions to vary the position of said sheet relative to said carriage for different combinations of upper-case and lower-case characters.

29. Apparatus according to claim 24 wherein said plurality of index lines comprises a plurality of spaced apart lines for varying the position of said sheet relative to said carriage for different sizes of characters.

30. Apparatus according to claim 25 having index means for adjusting said stop means to a plurality of predetermined positions spaced apart in said first direction.

31. Sign making apparatus for forming one or more rows of characters on a sign blank (B) by transfer of successive characters from a carrier sheet (S), which apparatus includes a base (10) for supporting said sign blank, a carriage (20) adapted to hold a carrier sheet carrying rows of transferable characters with the baselines of characters in successive rows on said carrier sheet being spaced apart in a first direction on said sheet at integral multiples (i) of a predetermined distance (d), means (17,25) for constraining movement of said carriage in said first direction to a plurality of discrete positions spaced apart at said incremental distance, gripping means (21) on said carriage for attaching said carrier sheet to said carriage so that movements of said carriage in said first direction locate the baselines of characters on said sheet at a plurality of locations spaced apart in said first direction at integral multiples of said incremental distance; characterized by first index means (40,41,$T_L$) for locating said carrier sheet in said first direction in predetermined relationships with respect to said carriage and said base, and means (44,45) for setting the position of an edge of said sign blank in said first direction relative to the positions of said baselines of said characters on said carrier sheet.

32. The apparatus of claim 31 wherein said carrier sheet carries indicia ($T_1$,$T_2$) defining a reference line across said sheet and said first index means comprises means ($T_L$) carried on said base and defining a target line with which said reference line across said sheet may be registered to locate said carrier sheet in said predetermined relationships to said carriage and said base.

33. The apparatus of claim 31 wherein said carrier sheet carries an indicium (r, FIG. 8) and said first index means comprises means (1 or LCM) carried on said carriage with which said indicium on said carrier sheet may be registered to locate said carrier sheet in said predetermined relationships to said carriage and said base.

34. The apparatus of claim 31 having a plurality of spacing indicator strips (36*a*, 36*b*, etc.) each carrying indicia representing a respective combination of character height and row spacing in said first direction, and means (34,35) for positioning an operator-selectable one of said strips adjacent an end of said sign blank in a predetermined position relative to said base in said first direction to afford an indication of how character rows using the combination of character height and row spacing on said one of said strips will fit on said sign blank.

35. The apparatus of claim 31 wherein said means for setting the position of an edge of said sign blank comprises stop means (45) having a first edge (45*a*) against which one of said edges of said sign blank may be abutted, said stop means being movable in said first direction atop said base, and cooperating index indicia (B, N, T;B, N, T) on said stop means and said base to indicate positioning of said first edge of said stop means at a plurality of predetermined positions.

36. The apparatus of claim 31 wherein said first index means comprises indicator means (41) carrying a target line ($T_L$) mounted on said base for movement relative to said base in said first direction, and cooperating index indicia (1, 2, 3, 4;1, 2, 3, 4) on said indicator means and said base to indicate the positioning of said target line to each of a plurality of predetermined positions.

37. The apparatus of claim 31 which includes a pair of racks (11*a*, 11*b*) extending parallel to each other along a pair of opposite edges of said base, a cursor member (12) extending in said first direction between said racks, a pair of interconnected pinions (13*a*, 13*b*) journalled on said cursor and engaging respective ones of said racks, said carriage (20) being mounted on said cursor member for movement along said cursor member in said first direction.

38. The apparatus of claim 31 wherein said gripping means on said carriage is operative to clamp an edge of said carrier sheet in any of a continuum of positions of said carrier sheet relative to said carriage.

39. The apparatus of claim 34 wherein said plurality of strips are joined end to end to form a continuous strip (36), wherein said base includes a window (10*e*) adjacent said sign blank, and wherein said means for positioning an operator-selectable one of said strips comprises reel means (34, 35) for positioning a selected section of said continuous strip to be visible in said window.

40. The apparatus of claim 34 having indicia (5, 6) on each of said indicator strips and an indicium (8*a*) on said base to indicate positioning of the selected one of said indicator strips to either one of two predetermined positions relative to said base in said first direction to afford an indication of how either an odd number of rows of characters or an even member of rows of characters will fit on said sign blank.

41. The apparatus of claim 34 having an indicium (5) on each of said indicator strips and indicia (8*a,* 8*b*) on said base to indicate positioning of the selected one of said indicator strips to either one of a plurality of predetermined positions relative to said base in said first direction to afford an indication of how rows of characters using the combination of character height and row spacing on said selected one of said strips will fit on sign blanks of different heights.

42. The apparatus of claim 35 wherein said stop means (45) has a second edge extending at an acute angle to said first direction, said apparatus includes means (44) on said base having an edge engaging said second edge of said stop means and extending at said acute angle, whereby movement of said stop means perpendicularly to said first direction moves said first edge of said stop means in said direction while maintaining said first edge of said stop means perpendicular to said first direction.

* * * * *